(12) United States Patent
Connors, Sr. et al.

(10) Patent No.: US 6,528,011 B2
(45) Date of Patent: Mar. 4, 2003

(54) COLLOIDAL SILICA REFRACTORY SYSTEM FOR AN ELECTRIC ARC FURNACE

(75) Inventors: Charles W. Connors, Sr., Wilmette, IL (US); Michael W. Anderson, West Chicago, IL (US)

(73) Assignee: Magneco/Metrel, Inc., Addison, IL (US)

( * ) Notice: Subject to any disclaimer, the term of this patent is extended or adjusted under 35 U.S.C. 154(b) by 8 days.

(21) Appl. No.: 09/814,341

(22) Filed: Mar. 21, 2001

(65) Prior Publication Data

US 2002/0175453 A1 Nov. 28, 2002

(51) Int. Cl.⁷ .................................. C21B 7/02
(52) U.S. Cl. .................. 266/286; 266/275; 501/128
(58) Field of Search ................ 266/275, 280, 266/286; 501/89, 128, 130

(56) References Cited

U.S. PATENT DOCUMENTS

| | | |
|---|---|---|
| 1,458,723 A | 6/1923 | Ohman |
| 1,458,726 A | 6/1923 | Ohman |
| 1,942,879 A | 1/1934 | Riddle |
| 2,314,758 A | 3/1943 | Berns |
| 2,388,080 A | 10/1945 | Riddle |
| 3,753,744 A | 8/1973 | Komaru et al. |
| 3,849,586 A | 11/1974 | Jacobs |
| 3,892,584 A | 7/1975 | Takeda et al. |
| 4,061,501 A | 12/1977 | Ivarsson et al. |
| 4,093,470 A * | 6/1978 | Cherry ................ 106/56 |
| 4,161,620 A | 7/1979 | Nakamura |
| 4,273,949 A | 6/1981 | Fischer et al. |
| 5,064,787 A | 11/1991 | Banerjee et al. |
| 5,147,830 A * | 9/1992 | Banerjee et al. ....... 501/89 |
| 5,147,834 A | 9/1992 | Banerjee et al. |
| 5,241,559 A | 8/1993 | Hixenbaugh |
| 5,382,555 A | 1/1995 | Stein et al. |
| 5,422,323 A | 6/1995 | Banerjee et al. |
| 5,423,519 A | 6/1995 | Connors, Sr. |
| 5,494,267 A | 2/1996 | Anderson et al. |
| 5,505,893 A | 4/1996 | Connors, Jr. |
| 5,632,937 A | 5/1997 | Soofi et al. |
| 5,795,508 A | 8/1998 | Soofi et al. |
| 5,868,956 A | 2/1999 | Yamamura et al. |
| 5,916,500 A | 6/1999 | Fisher, Jr. |
| 6,084,902 A | 7/2000 | Hawk |

* cited by examiner

Primary Examiner—Scott Kastler
(74) Attorney, Agent, or Firm—Brinks Hofer Gilson & Lione; Richard K. Clark

(57) ABSTRACT

The invention provides a colloidal refractory system for an electric arc furnace or another pyrometallurgical converter having a hearth, a shell, and a roof. The colloidal silica refractory includes alumina having a range of about 55 percent through about 90 percent by weight, silicon carbide having a range of about 2.5 percent through about 30 percent by weight, silica having a range of about 2 percent through about 20 percent by weight, and carbon having a range of about 0.1 percent through about 4 percent by weight. An aqueous colloidal silica binder provides the silica. The colloidal refractory system has high-temperature strength and resists the attack from slag and off-gases.

30 Claims, 2 Drawing Sheets

COLLOIDAL SILICA REFRACTORY SYSTEM FOR AN ELECTRIC ARC FURNACE

FIELD OF THE INVENTION

This invention generally relates to refractory materials used in pyrometallurgical converters. More particularly, this invention relates to colloidal silica refractory materials used in electric arc furnaces.

BACKGROUND OF THE INVENTION

Electric arc furnaces use electricity to convert scrap metal, flux, and alloying materials into molten iron and steel. The scrap metal may be any iron or steel material suitable for melting and usually corresponds to the desired composition of the molten metal. The flux materials may be selected to remove impurities, oxidize or deoxidize the molten metal, and perform other refining processes. The alloying materials depend upon the desired composition of the molten metal and the alloy content of the scrap.

A typical electric arc furnace (EAF) has a cylindrical or oval shape with a bowl-shaped bottom or hearth, vertical walls or a shell, and a domed roof made of refractory-lined steel plates. The shell and roof may have water-cooled panels. The shell may have one or more doors and other ports for adding materials, skimming slag, injecting oxygen and fuel such as natural gas and oil, taking tests, and the like. The roof usually opens for charging or loading scrap and other materials onto the hearth. One or more electrodes protrude through holes in the roof into the interior of the shell. Many EAFs have three electrodes arranged in a triangular pattern, forming a "delta portion" in the roof. A mast or other support structure raises and lowers the electrodes above the scrap and molten metal on the hearth. The roof may have an additional opening connected to an exhaust system for removal of off-gases. A tap hole with a refractory-lined spout or trough is on one side of the shell above the hearth. In some EAFs, the tap hole is located elsewhere such as on the bottom of the hearth as in an eccentric bottom tapping (EBT) design.

An EAF is often described by its capabilities such as capacity and transformer size. The capacity of an EAF is often stated as a maximum heat size, which may be up to 200 tons or more. A "heat" is one batch or cycle of converting scrap into molten iron or steel. The transformer size correlates to the speed of producing a heat and may be up to 100 MVA or more. EAFs usually produce a heat in the range of about one hour through about three hours. While intermittent operation is possible, most EAF's are operated continuously with only short maintenance periods.

In operation, the roof opens for charging or loading scrap and other materials onto the electric arc furnace. The roof closes and the electrodes are positioned above the scrap. An electric current is applied through electrodes, forming electric arcs. A single-electrode EAF typically uses direct current and generates electric arcs between the electrode and the hearth. A multiple-electrode EAF typically uses alternating current and generates electric arcs between the electrodes and between the electrodes and the hearth. The arcs generate heat, which causes the scrap and other materials to melt. Additional refining and alloying materials may be added. Oxygen may be injected or blown into the molten metal to remove carbon and other elements. When the composition, temperature, and other specifications are reached, the tap hole is opened and the molten metal is poured or tapped from the EAF into a ladle or a large refractory-lined, bucket-shaped container. If a "hot-heel" practice is used, a small portion of molten metal is left in the furnace for the next heat or batch of molten metal. After removal from the EAF, the molten metal usually undergoes further processing such as ladle refining, argon-oxygen decarburization, vacuum degassing, and the like.

The refractory material protects the hearth, shell, and roof, and holds scrap and molten metal during the conversion process. The refractory material usually depends on the slag system chosen for the EAF. Slag is a nonmetallic product produced by the reaction of flux materials with nonmetallic impurities. Flux materials generally help melt and separate impurities from the molten metal. The resulting slag floats on the molten metal and may be reactive with the refractory-material. In some slag systems, excess silica may be used and the refractory may be alumina, silica brick, siliceous rock, or the like. In other slag systems, excess magnesia or lime may be used and the refractory may be burnt dolomite, magnesite, or the like. The refractory material may be in the form of bricks, monolithic shapes, castable and pumpable forms, one or more combinations, and the like.

Generally, refractory materials need to withstand the charging of scrap, the tapping of molten metal, melting temperatures of about 3000° F., thermal cycling, corrosion and erosion by the molten metal and slag, and other factors associated with pyrometallurgical processes. The number of heats produced before a refractory material is replaced often characterizes the service life of the refractory material. The service life of a refractory also varies depending upon the position of the refractory material in the EAF. Refractory materials with a longer service life are highly desired to reduce the operating costs and increase the productivity of the EAF. The replacement of refractory materials is costly both in materials and labor. More importantly, the replacement of refractory materials idles and thus limits the productivity of an EAF.

Refractory materials in the roof usually have a lower service life because of the operating conditions affecting this part of the EAF. These refractory materials need sufficient structural properties to remain suspended above the hearth and to withstand vibrations from the electric arcs and from opening and closing of the roof. In addition to splashes of metal and slag, these refractory materials also need to be resistant to the off-gases generated during the conversion of the scrap and other materials into molten iron and steel. The off-gases rise above the molten metal, slag, and scrap during the conversion process. Typically, an evacuation system removes off-gases from the furnace. An access hole or port for the evacuation system may be located on the shell or on the roof. The evacuation system essentially pulls the off-gases along the roof refractory prior to exiting the furnace. The off-gases include gases evolved from the conversion process such as carbon monoxide, carbon dioxide, and water vapor. The off-gases also include slag and metal vapors and vapors from the reactions of the flux materials. The off-gases react with the refractory materials in the roof, reducing the structural integrity, thermal resistance, and other properties of the refractory. A portion of the roof adjacent or between the electrodes, the delta portion, essentially bears the worse of these operating conditions. The roof refractory usually comprises one or a combination of alumina-silica and alumina-silica-chromite refractory materials. The delta portion may be made of refractory materials different from the remainder of the roof. The delta portion usually is the first part of the roof to wear out or fail. Refractory materials used in the roof typically have a service life in the range of about 90 through about 120 heats.

SUMMARY

This invention provides a colloidal refractory system for an electric arc furnace or another pyrometallurgical converter. The colloidal refractory system has high-temperature strength and resists the attack from slag and off-gases inside the converter. The colloidal refractory system may be used to extend the service life of the roof refractory, especially the delta portion of an electric arc furnace.

A pyrometallurgical converter with the colloidal silica refractory system may have a hearth, a shell, and a roof. The shell is vertically disposed on the hearth. The roof is positioned on the shell and has a refractory portion made of the colloidal silica refractory. The colloidal silica refractory may comprise alumina ($Al_2O_3$), silicon carbide (SiC), silica ($SiO_2$), and carbon (C). The $Al_2O_3$ has a range of about 55 percent through about 90 percent by weight. The SiC has a range of about 2.5 percent through about 30 percent by weight. The $SiO_2$ has a range of about 2 percent through about 20 percent by weight. The C has a range of about 0.1 percent through about 4 percent by weight.

In a method of manufacturing a colloidal silica refractory, a casting composition is mixed. The casting composition may comprise $Al_2O_3$, SiC, C, and an aqueous colloidal silica binder having about 15 percent through about 70 percent of $SiO_2$ by weight. The casting composition is transported into a mold for a refractory portion. The casting composition is cured into a refractory material. The refractory material may comprise $Al_2O_3$ in a range of about 55 percent through about 90 percent by weight, SiC in a range of about 2.5 percent through about 30 percent by weight, $SiO_2$ in a range of about 2 percent through about 28 percent by weight, and C in a range of about 0.1 percent through about 4 percent by weight.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENTS

Figure 1:
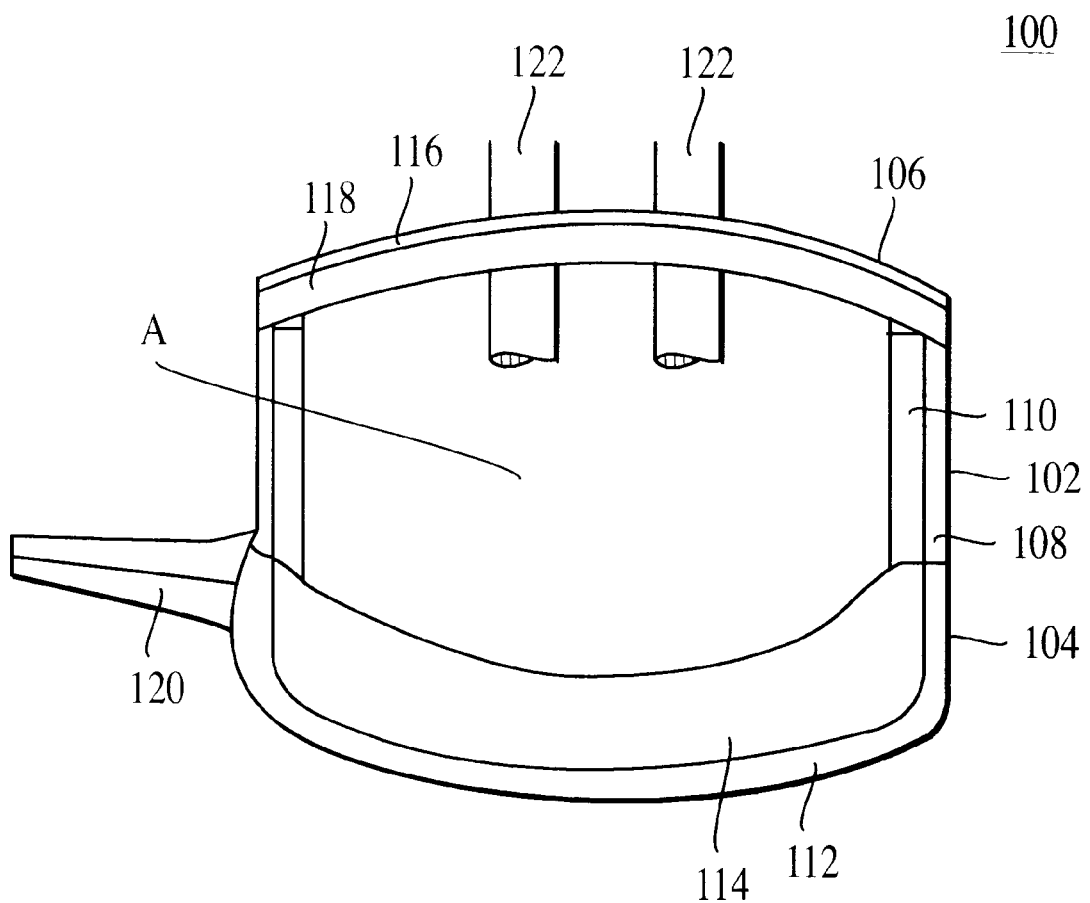
FIG. 1 represents a schematic side view of an electric arc furnace having a colloidal silica refractory system according to one embodiment.

FIG. 1 represents a schematic side view of an electric arc furnace 100 having a colloidal silica refractory system according to one embodiment. The electric arc furnace 100 has a shell 102 vertically disposed on a hearth 104. The shell 102 and hearth 104 form a containment area A for performing pyrometallurgical processes such as melting, refining, and the like. The shell 102 has a tap hole (not shown) with a refractory-line spout 120 mounted on one side. The tap hole may be located on the bottom of the hearth, in which case there may not be a spout. A roof 106 is mounted on the shell 102, and may be slidably mounted, to open and close the containment area for charging scrap and other materials. The roof 106 has electrodes 122 each protruding through a hole (not shown) into the containment area A. There may be one or more electrodes 122. In one aspect, there are three electrodes 122 arranged in a triangular configuration. A mast structure (not shown) raises and lowers the electrodes 122 into the containment area A. The electric arc furnace 100 may have other configurations using fewer or additional components. The colloidal refractory system also may be used in other pyrometallurgical converters and processes such as a ladle refining station, an argon-oxygen decarburization vessel, a basic oxygen furnace, and the like. If used in a ladle refining station, a ladle forms the hearth and shell.

In one aspect, the shell 102 has a shell structure 108 supporting a shell refractory 110. The hearth 104 has a hearth structure 112 supporting a hearth refractory 114. The roof 106 has a roof structure 116 supporting a roof refractory 118. The shell, hearth, and roof structures 108, 112, and 116 may be formed by steel plates (not shown) and steel support members (not shown). The shell and roof structures 108 and 116 each may have one or more water-cooled panels (not shown). The shell, hearth, and roof refractory 110, 114, and 118 may be any suitable refractory material such as silica, burnt dolomite, magnesite, alumina, a combination or combinations, or the like. The refractory material may be colloidal silica refractory, which may be used with other refractory materials. The refractory material may be in the form of bricks, monolithic shapes, castable and pumpable forms, and the like.

Figure 2:
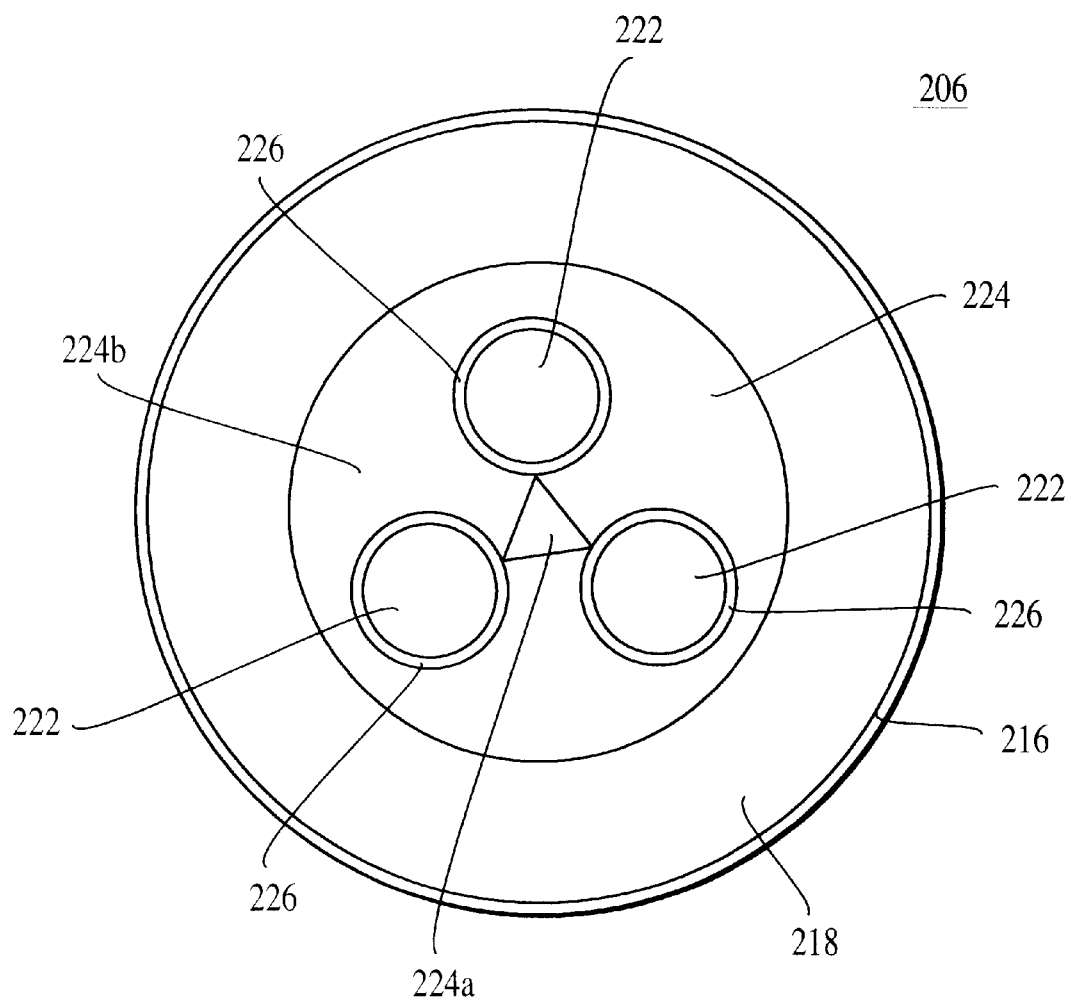
FIG. 2 represents a schematic bottom view of a roof for an electric arc furnace having a colloidal silica refractory system according to one embodiment.

FIG. 2 represents a schematic bottom view of a roof 206 for an electric arc furnace having a colloidal silica refractory system according to one embodiment. The roof 206 has a roof structure 216 and a roof refractory 218 forming a hole 226 for each electrode 222. In one aspect, the roof 206 has three holes 226 for use with three electrodes 224. In other aspects, one or more holes may be used with one or more electrodes. The roof 206 may have another hole or access port (not shown) for use with an off-gas evacuation system (not shown). In this aspect, the holes 226 are arranged in a triangular configuration.

The roof refractory 218 has a delta portion 224, which includes at least a first area 224a between the holes 226 and may include a second area 224b surrounding the holes 226. The first area 224a essentially comprises the area between the electrodes and may be larger, smaller, and have different shapes depending on the arrangement of the electrodes. The delta portion 224 may have other configurations and may not have a triangular shape, especially when a different number of electrodes are used. The delta portion 224 may be made from colloidal silica refractory. The remaining roof refractory 218 may be made from another or combination of refractory materials. The entire roof refractory 218 may be made from colloidal silica refractory.

The colloidal silica refractory comprises alumina ($Al_2O_3$), silicon carbide (SiC), silica ($SiO_2$), and carbon (C). In one aspect, the $Al_2O_3$ is within a range of about 55 percent through about 90 percent by weight. The SiC is within a range of about 2.5 percent through about 30 percent by weight. The $SiO_2$ is within a range of about 2 percent through about 20 percent by weight. The C is within a range of about 2 percent through about 4 percent by weight. The colloidal silica refractory may further comprise titania ($TiO_2$) in the range of about 0.5 through about 5 percent by weight. In another aspect, the $Al_2O_3$ is about 74 percent by weight. The SiC is about 17 percent by weight. The SiO$_2$ is about 6.5 percent by weight. The C is about 1 percent by weight. In this aspect, the colloidal silica refractory may further comprise TiO$_2$ of about 2 percent by weight. The colloidal silica refractory may have other components especially those associated with the manufacture of refractory materials.

The alumina provides high temperature strength. The silicon carbide provides resistance to slag and molten metal. The combination of silicon carbide and carbon provides resistance to slag and the off-gases. Titania improves the resistance of the refractory to the off-gases. The titania may be added or may be introduced as a minor component of raw materials used to manufacture the colloidal silica refractory. In one aspect, the titania is present in brown fused alumina or bauxite. The titania may be less than about 5% percent of the brown fused alumina or bauxite. While the amounts of other components may vary within and outside the ranges described, the amount of carbon is preferably less than about 4 percent by weight. The roof refractory is exposed to air, which may oxidize carbon at levels above about 4 percent by weight. Once oxidized, the carbon leaves voids in the refractory material. The voids enable the off-gases and slag to penetrate the refractory material, thus causing premature failure of the refractory. While particular benefits and features of the refractory components have been described, other benefits and features may be present from the components individually or in combination.

The alumina improves strength of the refractory material without significantly increasing the susceptibility to attack from slag. The alumina may have an average particle diameter in the range of about 30 micrometers through about 7 millimeters. In one aspect, the alumina is selected from at least one of brown fused alumina, white fused alumina, tabular alumina, reactive alumina, calcined alumina, and aluminosilicate such as mullite or bauxite type material. If titania is used, the titania may have the same average particle diameter as the alumina.

The silicon carbide is chemically resistant to attack from slag and off-gases, and also protects other components that may be less resistant. Higher amounts of silicon carbide generally contribute to increased slag resistance. The silicon carbide may have an average particle diameter in the range of about 30 micrometers through about 3.5 millimeters, in order to promote flow of the composition during pumping and strength of the resulting lining.

The carbon also resists attack from the slag and off-gases. The carbon acts as a non-wetting agent to inhibit reactions with the slag. The carbon may be provided in the form of graphite, pitch, or other suitable form. The carbon may have an average particle diameter in the range of about 40 microns through about 0.5 mm.

The silica is provided in the form of an aqueous colloidal silica binder. The silica may be provided by an aluminosilicate type material or a fumed silica material in addition to the aqueous colloidal silica binder. The alumino-silicate material may provide up to about 15 percent of the silica. The fumed silica material may provide up to 10 percent of the silica. In one aspect, the colloidal silica provides in the range of about 2 percent through about 8 percent of the silica. The colloidal silica is mixed with the other components to form a casting composition. Upon drying and curing, the casting composition forms a colloidal silica refractory material. The colloidal silica imparts excellent flow properties that permit the casting composition to be easily transported from a source to a destination using a pump or another suitable casting device. In one aspect, the colloidal silica solution is about 40 percent solids (SiO$_2$) and about 60 percent water by weight. In this aspect, between about 5 percent through about 20 percent of this solution is used by weight of the dry component. In another aspect, about 10 pounds of the colloidal silica solution (about 4 pounds silica and about 6 pounds water) are added to about 100 pounds of the dry materials. After the refractory has been formed and dried, the colloidal silica acts as an binder, thus contributing strength and erosion resistance to the refractory. The colloidal silica reduces or eliminates the need to use a calcia based-cement with the refractory material. The calcia based cement usually contains lime (CaO). In one aspect, the CaO content of the refractory material is less than about 1 percent by weight. In another aspect, the CaO content is about 0.1 percent by weight. The lower lime content improves the high temperature strength of the refractory.

The aqueous colloidal silica binder comprises colloidal silica in water, where the colloidal silica may be in the range of about 15 percent through about 70 percent by weight. In one aspect, the colloidal silica is in the range of about 30 percent through about 50 percent by weight. In another aspect, the colloidal silica is about 40 percent by weight. The colloidal silica may have an average particle diameter in the range of about 4 millimicrons through about 100 millimicrons. In one aspect, the colloidal silica has an average particle diameter in the range of about 6 millimicrons through about 50 millimicrons. In another aspect, the colloidal silica has an average particle diameter in the range of about 8 millimicrons through about 20 millimicrons.

In a method to manufacture the colloidal silica refractory material according to one embodiment, the aqueous colloidal silica is mixed with the other components of the refractory material. A wide distribution of particle sizes facilitates flow and castability of the composition. In one aspect, one or more of the other components has an essentially dry form. The resulting casting composition is transported from the mixing place to a destination using a pump or another suitable casting device. The casting composition is formed into a desired shape for the refractory material. If the desired shape is the delta portion of the furnace, metal and wooden forms may be used to form a mold or other container having the requisite shape and electrode holes. Similarly, a mold having the requisite shape and holes may be used if the desired shape is the entire roof refractory. The delta portion or roof refractory may be formed on the roof structure, where the casting composition may be mixed in the mold.

After being formed into the desired shape, the casting composition is cured into the colloidal silica refractory having one of the compositions previously discussed. The curing process may include hardening or setting, drying, and heat-treating the casting composition. In one aspect, the hardening, drying, and heat-treating occur sequentially. The casting compound hardens or sets at ambient temperature, which may be above about 40° F. The hardening or setting time may be in the range of about 15 minutes through about five hours. The casting compound may be dried at a drying temperature of up to about 250° F. for up to about 24 hours. The casting compound may be heat-treated at a temperature above 250° F. for about five hours through about 30 hours. While particular methods are described, other methods may be used to produce a delta or other refractory portion having a colloidal silica refractory system.

The colloidal silica refractory was tested in the delta portion of an EAF. The following example is included to illustrate an embodiment and is not to be construed as imposing limitations on the invention.

EXAMPLE

An EAF delta portion having a colloidal silica refractory was prepared using the previously discussed methods and compositions.

The composition of the colloidal silica refractory is as follows:

| COMPONENT | % By Weight |
|---|---|
| Alumina ($Al_2O_3$) | ~74.0 |
| Silicon Carbide (SiC) | ~17.0 |
| Silica ($SiO_2$) | ~6.5 |
| Titania ($TiO_2$) | ~2.0 |
| Lime (CaO) | ~0.1 |
| Carbon (C) | ~1.0 |

The operating characteristics of the EAF are as follows:

| Furnace Type | EBT |
|---|---|
| Capacity | 180 tonnes |
| Transformer | 80 MVA |
| Oxygen Lances | Yes (2) |
| Oxygen-Fuel Burners | Yes (3) |
| Oxygen Consumption | 30 m³/tonne |
| Power Consumption | 415 Kwh/tonne |
| Foaming Slag Practice | Yes |
| Tap to Tap Time | 65–70 minutes |
| Hot Heel Practice | Yes, 15–20 tonnes |
| Delta Portion Service Life | 97–117 heats |

The colloidal silica refractory provided significantly better resistance to attack from off-gases and slag than conventional refractory materials used in the delta portion of an EAF. The delta portion in the example had a service life of 167 heats.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A pyrometallurgical converter having a colloidal silica refractory system, comprising:
   a hearth,
   a shell vertically disposed on the hearth; and
   a roof disposed on the shell, the roof having a refractory portion comprising $Al_2O_3$, SiC, $SiO_2$, C, and $TiO_2$,
      where the $Al_2O_3$ has a range of about 55 percent through about 90 percent by weight,
      where the SiC has a range of about 2.5 percent through about 30 percent by weight,
      where the $SiO_2$ has a range of about 2 percent through about 20 percent by weight,
      where the C has a range of about 0.1 percent through about 4 percent by weight, and
      where the $TiO_2$ has a range of about 0.5 through about 5 percent by weight.

2. A pyrometallurgical converter having a colloidal silica refractory system, comprising:
   a hearth,
   a shell vertically; disposed on the hearth; and
   a roof disposed on the shell, the roof having a refractory portion comprising $Al_2O_3$, SiC, $SiO_2$, C, and CaO,
      where the $Al_2O_3$ has a range of about 55 percent through about 90 percent by weight,
      where the SiC has a range of about 2.5 percent through about 30 percent by weight,
      where the $Sio_2$ has a range of about 2 percent through about 20 percent by weight,
      where the C has a range of about 0.1 percent through about 4 percent by weight, and
      where the CaO is less than about 1 percent by weight.

3. The pyrometallurgical converter according to claim 2, where the pyrometallurgical converter is an electric arc furnace and the refractory portion is essentially the entire roof refractory.

4. The pyrometallurgical converter according to claim 2, where the pyrometallurgical converter is an electric arc furnace and the refractory portion is a delta portion.

5. The pyrometallurgical converter according to claim 4, where the roof refractory forms one or more holes, and where the delta portion comprises at least one of a first area and a second area, the first area between the one or more holes, the second area adjacent to the one or more holes.

6. The pyrometallurgical converter according to claim 5, where the delta portion further comprises a third area surrounding the one or more holes.

7. A colloidal silica refractory system for a pyrometallurgical converter, comprising:
   $Al_2O_3$ having a range of about 55 percent through about 90 percent by weight;
   SiC having a range of about 2.5 percent through about 30 percent by weight;
   $SiO_2$ having a range of about 2 percent through about 20 percent by weight;
   C having a range of about 0.1 percent through about 4 percent by weight; and
   $TiO_2$ having a range of about 0.5 through about 5 percent by weight.

8. The colloidal silica refractory system according to claim 7, where the $Al_2O_3$ is about 74 percent by weight, where the SiC is about 17 percent by weight, where the $SiO_2$ is about 6.5 percent by weight, and where the C is about 1 percent by weight.

9. The pyrometallurgical converter according to claim 8, where the $TiO_2$ is about 2 percent by weight.

10. A colloidal silica refractory system for a pyrometallurgical converter, comprising:
    $Al_2O_3$ having a range of about 55 percent through about 90 percent by weight;
    SiC having a range of about 2.5 percent through about 30 percent by weight;
    $SiO_2$ having a range of about 2 percent through about 20 percent by weight;
    C having a range of about 0.1 percent through about 4 percent by weight; and
    CaO having less than about 1 percent by weight.

11. The colloidal silica refractory system according to claim 10, where the CaO has about 0.1 percent by weight.

12. The colloidal silica refractory system according to claim 10, where
    the $Al_2O_3$ has an average particle diameter in the range of about 30 micrometers through about 7 millimeters,
    the SiC has an average particle diameter in the range of about 30 micrometers through about 3.5 millimeters, the SiO$_2$ has an average particle diameter in the range of about 4 millimicrons through about 100 millimicrons: and the C has an average particle diameter in the range of about 40 microns through about 0.5 mm.

13. A method of manufacturing a colloidal silica refractory for a pyrometallurgical converter, comprising:

mixing a casting composition comprising Al$_2$O$_3$, SiC, C, and TiO$_2$, with an aqueous colloidal silica binder having about 15 percent through about 70 percent of SiO$_2$ by weight;

transporting the casting composition into a mold for a refractory portion;

curing the casting composition into a refractory material comprising Al$_2$O$_3$ having a range of about 55 percent through about 90 percent by weight, SiC having a range of about 2.5 percent through about 30 percent by weight, SiO$_2$ having a range of about 2 percent through about 20 percent by weight, C having a range of about 0.1 percent through about 4 percent by weight, and TiO$_2$ having a range of about 0.5 through about 5 percent by weight.

14. A method of manufacturing a colloidal silica refractory according to claim 13, where the aqueous colloidal silica binder has about 30 percent through about 50 percent of SiO$_2$ by weight.

15. A method of manufacturing a colloidal silica refractory according to claim 13, where the aqueous colloidal silica binder has about 40 percent of SiO$_2$ by weight.

16. A method of manufacturing a colloidal silica refractory according to claim 13, where the Al$_2$O$_3$ has an average particle diameter in the range of about 30 micrometers through about 7 millimeters, the SiC has an average particle diameter in the range of about 30 micrometers through about 3.5 millimeters, the SiO$_2$ has an average particle diameter in the range of about 4 millimicrons through about 100 millimicrons, and the C has an average particle diameter in the range of about 40 microns through about 0.5 mm.

17. A method of manufacturing a colloidal silica refractory according to claim 16, where the SiO$_2$ has an average particle diameter in the range of about 6 millimicrons through about 50 millimicrons.

18. A method of manufacturing a colloidal silica refractory according to claim 16, where the SiO$_2$ has may have an average particle diameter in the range of about 8 millimicrons through about 20 millimicrons.

19. A method of manufacturing a colloidal silica refractory according to claim 16, where the TiO$_2$ has an average particle diameter in the range of about 30 micrometers through about 7 millimeters.

20. A method of manufacturing a colloidal silica refractory according to claim 13, where the casting composition further comprises CaO having less than about 1 percent by weight.

21. A method of manufacturing a colloidal silica refractory according to claim 13, further comprising hardening the casting compound at ambient temperature for about 15 minutes through about five hours.

22. A method of manufacturing a colloidal silica refractory according to claim 21, further comprising drying the casting compound at a drying temperature of up to about 250° F. for up to about 24 hours.

23. A method of manufacturing a colloidal silica refractory according to claim 22, further comprising heat-treating the casting compound at a temperature above 250° F. for about five hours through about 30 hours.

24. A method of manufacturing a colloidal silica refractory according to claim 13, where the refractory portion is essentially the entire roof refractory.

25. A method of manufacturing a colloidal silica refractory according to claim 13, where the refractory portion is a delta portion.

26. The pyrometallurgical converter according to claim 3, where the pyrometallurgical converter is an electric arc furnace and the refractory portion is essentially the entire roof refractory.

27. The pyrometallurgical converter according to claim 3, where the pyrometallurgical converter is an electric arc furnace and the refractory portion is a delta portion.

28. The pyrometallurgical converter according to claim 27, where the roof refractory forms one or more holes, and where the delta portion comprises at least one of a first area and a second area, the first area between the one or more holes, the second area adjacent to the one or more holes.

29. The pyrometallurgical converter according to claim 28, where the delta portion further comprises a third area surrounding the one or more holes.

30. The colloidal silica refractory system according to claim 7, where the Al$_2$O$_3$ has an average particle diameter in the range of about 30 micrometers through about 7 millimeters, the SiC has an average particle diameter in the range of about 30 micrometers through about 3.5 millimeters, the SiO$_2$ has an average particle diameter in the range of about 4 millimicrons through about 100 millimicrons, and the C has an average particle diameter in the range of about 40 microns through about 0.5 mm.

* * * * *

UNITED STATES PATENT AND TRADEMARK OFFICE
CERTIFICATE OF CORRECTION

PATENT NO.    : 6,528,011 B2
DATED         : March 4, 2003
INVENTOR(S)   : Charles W. Connors, Sr. et al.

It is certified that error appears in the above-identified patent and that said Letters Patent is hereby corrected as shown below:

<u>Column 8,</u>
Line 9, delete "Sio$_2$" and substitute -- SiO$_2$ -- in its place.
Line 65, immediately after "millimicrons" delete ":" (colon) and substitute
-- , -- (comma) in its place.

<u>Column 9,</u>
Line 47, before "may have" delete "has".

<u>Column 10,</u>
Lines 13 and 16, immediately after "250º F" delete "." (period).

Signed and Sealed this

Twenty-eighth Day of October, 2003

JAMES E. ROGAN
*Director of the United States Patent and Trademark Office*